United States Patent
Min et al.

(10) Patent No.: US 9,958,742 B2
(45) Date of Patent: May 1, 2018

(54) OPTICAL ELEMENT WITH CONDUCTIVE COMPOSITE LAYER

(71) Applicant: LG CHEM, LTD., Seoul (KR)

(72) Inventors: Sung Joon Min, Daejeon (KR); Eun Jung Lim, Daejeon (KR); Dong Hyun Oh, Daejeon (KR); Jung Woon Kim, Daejeon (KR); Jung Sun You, Daejeon (KR); Jin Hong Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 209 days.

(21) Appl. No.: 15/038,369

(22) PCT Filed: Mar. 9, 2015

(86) PCT No.: PCT/KR2015/002250
§ 371 (c)(1),
(2) Date: May 20, 2016

(87) PCT Pub. No.: WO2015/133878
PCT Pub. Date: Sep. 11, 2015

(65) Prior Publication Data
US 2016/0291357 A1     Oct. 6, 2016

(30) Foreign Application Priority Data

Mar. 7, 2014 (KR) .......... 10-2014-0027222
Mar. 9, 2015 (KR) .......... 10-2015-0032441

(51) Int. Cl.
*G02F 1/1343* (2006.01)
*B60J 7/043* (2006.01)
(Continued)

(52) U.S. Cl.
CPC .......... *G02F 1/13439* (2013.01); *B60J 7/043* (2013.01); *E06B 9/24* (2013.01); *G02B 5/282* (2013.01);
(Continued)

(58) Field of Classification Search
CPC ...... B60J 3/04; B60J 7/00; B60J 7/043; E06B 2009/2464; E06B 9/24; G02B 1/116;
(Continued)

(56) References Cited

U.S. PATENT DOCUMENTS

| 4,749,261 A | 6/1988 | McLaughlin et al. |
| 5,111,329 A | 5/1992 | Gajewski et al. |

(Continued)

FOREIGN PATENT DOCUMENTS

| CN | 101438205 A | 5/2009 |
| JP | S61-256506 A | 11/1986 |

(Continued)

OTHER PUBLICATIONS

Extended European Search Report issued for European Patent Application No. 15758039.0 dated Jul. 12, 2017 (10 pages).
Office Action issued for Japanese Patent Application No. 2016-525065 dated Jul. 4, 2017 (3 pages).
Search Report issued for International Application No. PTC/KR2015/002250 dated Apr. 22, 2015 (5 pages).
(Continued)

*Primary Examiner* — Huyen Ngo
(74) *Attorney, Agent, or Firm* — Rothwell, Figg, Ernst & Manbeck, P.C.

(57) ABSTRACT

The present application relates to an optical element. The exemplary optical element may have a variable transmittance by whether an external signal is applied or not. Also, since the optical element may apply the external signal by using a composite layer having a low transmittance to light in an infrared region, the optical element may block heat, and save energy. Such an optical element may be usefully employed in various optical devices, for example, a sunroof.

20 Claims, 4 Drawing Sheets

(51) Int. Cl.

| | |
|---|---|
| *E06B 9/24* | (2006.01) |
| *G02F 1/1335* | (2006.01) |
| *G02F 1/137* | (2006.01) |
| *G02B 5/30* | (2006.01) |
| *G02B 5/28* | (2006.01) |
| *G02F 1/155* | (2006.01) |
| *G02F 1/167* | (2006.01) |
| *B60J 3/04* | (2006.01) |
| *B60J 7/00* | (2006.01) |
| *G02B 26/06* | (2006.01) |

(52) U.S. Cl.
CPC ........... *G02B 5/3016* (2013.01); *G02F 1/137* (2013.01); *G02F 1/13737* (2013.01); *G02F 1/133509* (2013.01); *G02F 1/133512* (2013.01); *G02F 1/155* (2013.01); *G02F 1/167* (2013.01); *B60J 3/04* (2013.01); *B60J 7/00* (2013.01); *E06B 2009/2464* (2013.01); *G02B 26/06* (2013.01); *G02F 2001/13756* (2013.01); *G02F 2001/133521* (2013.01); *G02F 2001/1676* (2013.01); *G02F 2201/083* (2013.01); *G02F 2201/44* (2013.01); *G02F 2203/055* (2013.01)

(58) Field of Classification Search
CPC ... G02B 26/06; G02B 5/282; G02F 1/133509; G02F 1/133512; G02F 1/13737; G02F 1/155; G02F 2201/083; G06F 1/1603
See application file for complete search history.

(56) References Cited

U.S. PATENT DOCUMENTS

| | | | |
|---|---|---|---|
| 5,408,353 | A | 4/1995 | Nichols et al. |
| 6,015,507 | A * | 1/2000 | Kobayashi ........... C09K 19/544 |
| | | | 252/299.01 |
| 2007/0152188 | A1* | 7/2007 | Silverman .............. B82Y 20/00 |
| | | | 252/299.01 |
| 2007/0206263 | A1 | 9/2007 | Neuman et al. |
| 2012/0058879 | A1 | 3/2012 | Kim et al. |
| 2015/0002936 | A1* | 1/2015 | Jun ....................... G06F 1/1603 |
| | | | 359/492.01 |

FOREIGN PATENT DOCUMENTS

| | | |
|---|---|---|
| JP | S62-229116 A | 10/1987 |
| JP | H05-025479 A | 2/1993 |
| JP | H06-160823 A | 6/1994 |
| JP | H09-143680 A | 6/1997 |
| JP | H11-064831 A | 3/1999 |
| JP | H11-323341 A | 11/1999 |
| JP | 2006-301487 A | 11/2006 |
| JP | 2006-330511 A | 12/2006 |
| JP | 2009-529153 A | 8/2009 |
| WO | 2010-098576 A2 | 9/2010 |

OTHER PUBLICATIONS

Office Action issued for Chinese Patent Application No. 201580002633.9 dated Jan. 30, 2018 (7 pages).

* cited by examiner

【Figure 1】
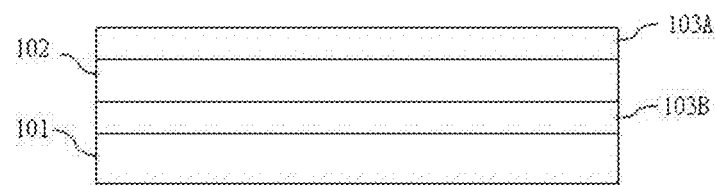
【Figure 2】
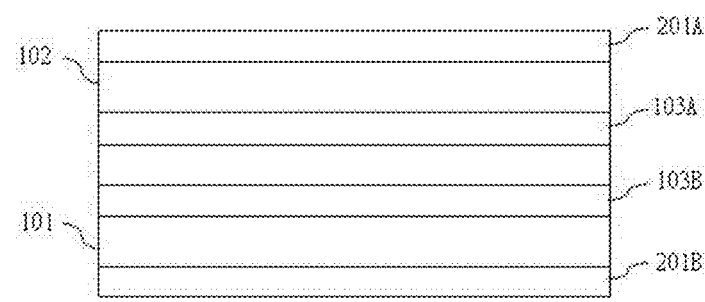

【Figure 3】
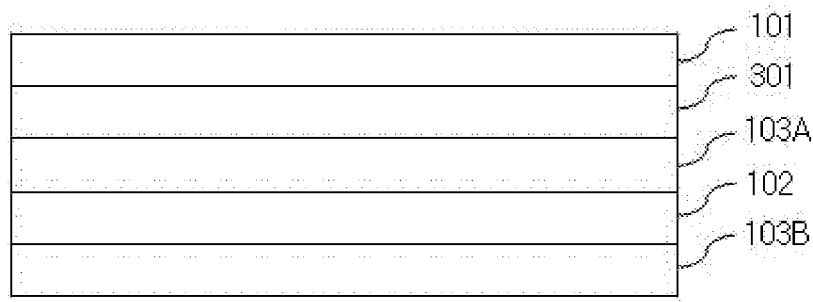
【Figure 4】
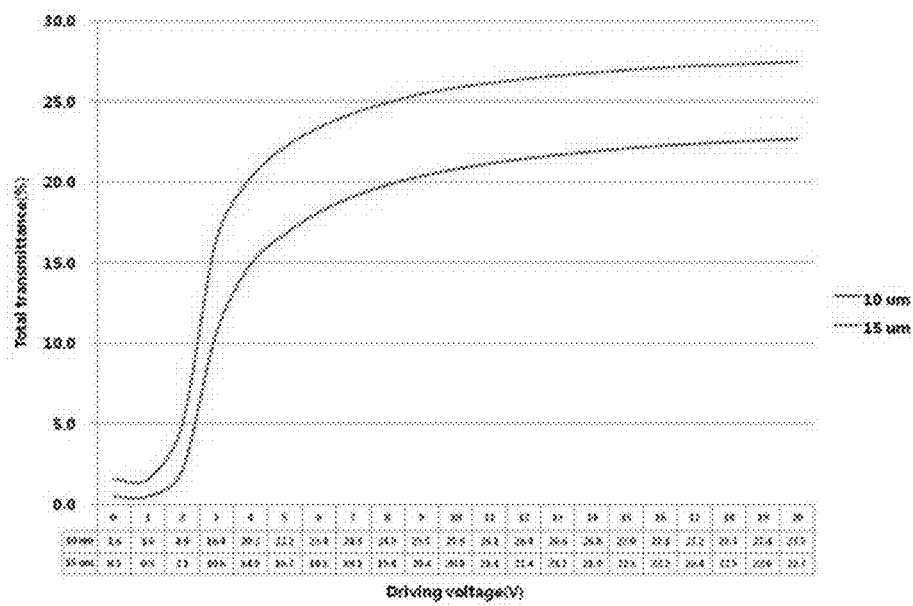

【Figure 5】
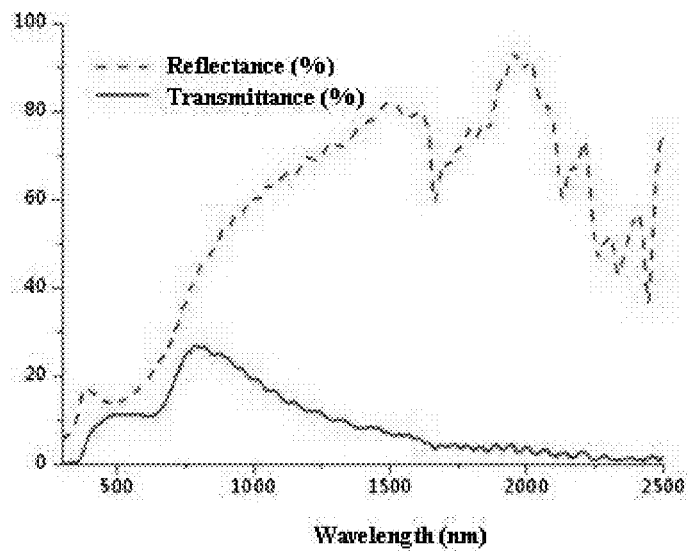
【Figure 6】
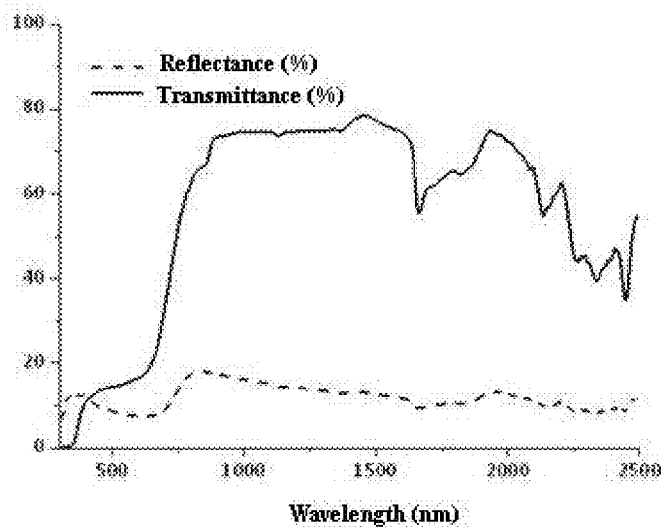

【Figure 7】
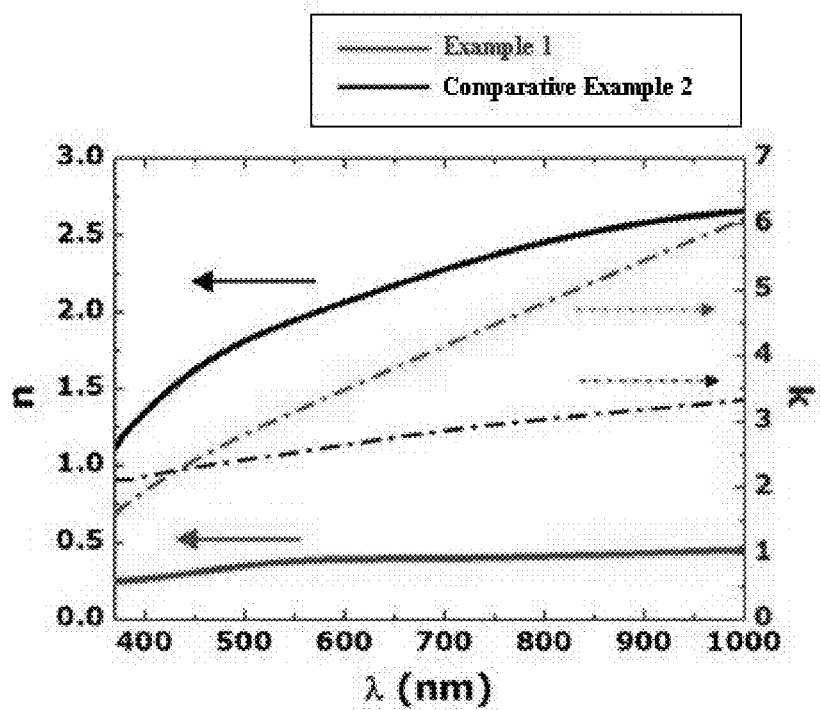
【Figure 8】
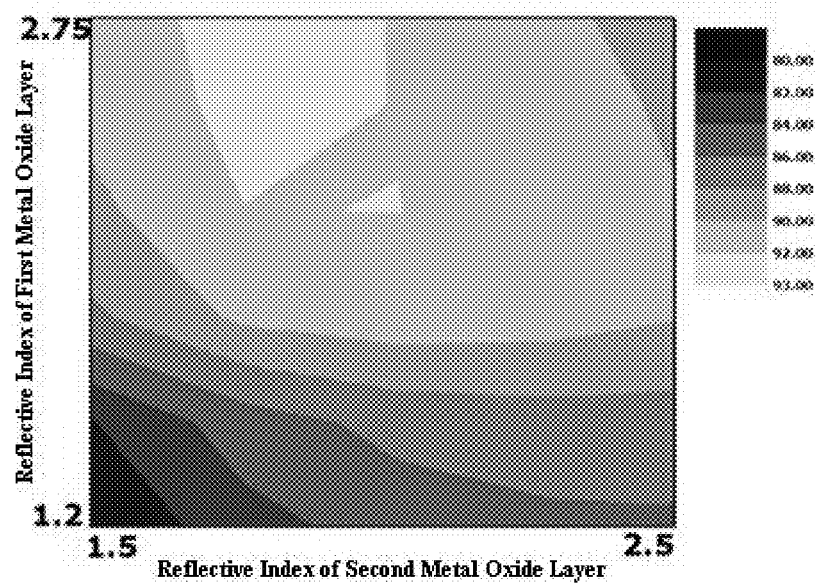

OPTICAL ELEMENT WITH CONDUCTIVE COMPOSITE LAYER

CROSS-REFERENCE TO RELATED APPLICATIONS

This application is a 35 U.S.C. § 371 National Phase Entry Application from PCT/KR2015/002250, filed on Mar. 9, 2015, and designating the United States, which claims priority under 35 U.S.C. § 119 to Korean Patent Application No. 10-2014-0027222, filed on Mar. 7, 2014, and Korean Patent Application No. 10-2015-0032441, filed on Mar. 9, 2015, the entire contents of which are incorporated herein by reference.

TECHNICAL FIELD

The present application relates to an optical element and a use thereof.

BACKGROUND ART

A sunroof is a fixed or moving (venting or sliding) opening generally present on a ceiling of an automobile, and allows light or fresh air to enter into the automobile. Such a sunroof may be operated manually or by a motor, and a shape, a size or a style of the sunroof varies according to a desired use thereof. For example, the sunroof is classified into a pop-up type sunroof, a spoiler (tile & slide) type sunroof, an in-built type sunroof, a folding type sunroof, a top-mount type sunroof, a panoramic roof system type sunroof, a removable roof panels (t-tops or targa roofs) type sunroof or a solar type sunroof according to an operation mode. In addition, studies on materials for a sunroof are actively progressing, and for example, in International Patent Publication No. 2010-098576, a technique of manufacturing a sunroof having an excellent absorption of ultraviolet rays and solar heat rays using a glass composition formed in a specific composition is disclosed.

DISCLOSURE

Technical Problem

The present application is directed to providing an optical element having a variable transmittance according to whether an external signal is applied or not. The present application is also directed to providing an energy-saving optical element having a heat-blocking effect by applying the external signal using a composite layer having a low transmittance in an infrared region.

An exemplary optical element of the present application may include a polarizing layer, a liquid crystal layer and a composite layer. Here, the liquid crystal layer may be formed on the polarizing layer, and include a liquid crystal compound and an anisotropic dye. Here, the composite layer may be adjacent to the liquid crystal layer, and sequentially include a first oxide layer, a metal layer and a second oxide layer. Here, the liquid crystal compound and/or anisotropic dye may be present in an aligned state, and the alignment of the liquid crystal compound may be changed by a signal applied by the composite layer. One composite layer may be adjacent to one side of the liquid crystal layer, or two composite layers may be adjacent to both sides of the liquid crystal layer. FIG. 1 shows an optical element including two composite layers present on both sides of a liquid crystal layer, for example, an optical element including a polarizing layer 101, a liquid crystal layer 102 formed on the polarizing layer, and two composite layers 103A and 103B disposed on both sides of the liquid crystal layer.

The exemplary optical element of the present application may have a variable light transmittance by a signal applied from an external environment. The signal applied from an external environment may be, for example, a voltage applied by the composite layer. As will be described below, the composite layer has a low transmittance with respect to light in an infrared region. Accordingly, when the voltage is applied using the composite layer, heat may be blocked, and thus energy is saved. Hereinafter, the optical element will be described in further detail.

The term "polarizing layer" used herein may be a functional layer exhibiting selective transmitting and blocking properties, for example, a reflective or absorbing property, with respect to incident light. The polarizing layer may have a function of transmitting light vibrating in one direction from incident light vibrating in various directions, and blocking light vibrating in the rest directions. A type of the polarizing layer may be, but is not particularly limited to, for example, as a reflection-type polarizing layer, a dual brightness enhancement film (DBEF), a lyotropic liquid crystal (LLC) layer or a wire grid polarizer may be used, and, as a absorption-type polarizing layer, a polarizer formed by staining a polymer stretched film such as a PVA stretched film with iodine or a guest-host type polarizer using liquid crystals polymerized in an aligned state as a host and an anisotropic dye arranged according to the alignment of the liquid crystals as a guest may be used, but the present application is not limited thereto.

In the present application, the liquid crystal layer may include a liquid crystal compound and an anisotropic dye. The liquid crystal layer may be a guest-host type liquid crystal layer. The guest-host-type liquid crystal layer exhibits an anisotropic light absorbing effect by that the dichroic dye is arranged along the arrangement of the liquid crystal compound and that light parallel to an alignment direction of the dye is absorbed and light vertical to the alignment direction of the dye is transmitted. The alignment direction of the liquid crystal compound and/or anisotropic dye in the liquid crystal layer may be changed by a signal applied from an external environment. In this case, the signal applied by an external environment may be any type of signal performed to change the alignment of the liquid crystal compound and/or anisotropic dye, and as a representative example, the signal is the application of a voltage.

As the liquid crystal compound, any type of liquid crystal compound may be used, provided that the aligned direction of the liquid crystal compound can be changed by the application of an external signal. For example, as the liquid crystal compound, a smectic liquid crystal compound, a nematic liquid crystal compound or a cholesteric liquid crystal compound may be used. In addition, the liquid crystal compound may be, for example, a compound without having a polarizable or crosslinkable group to change the alignment direction by the application of an external signal.

In one example, as the liquid crystal compound, a nematic liquid crystal compound may be used. As the compound, for example, a nematic liquid crystal compound satisfying Formula 1 may be used.

$$(1.53-b) < \{(2n_o^2 + n_e^2)/3\}^{0.5} < (1.53+b) \quad \text{[Formula 1]}$$

In Formula 1, $n_o$ is an ordinary refractive index of the liquid crystal compound, for example, a refractive index of the nematic liquid crystal compound in a minor axis direction, $n_e$ is an extraordinary refractive index of the liquid crystal compound, for example, a refractive index of the nematic liquid crystal compound in a major axis direction, and b is a number satisfying 0.1≤b≤1. A liquid crystal cell ensuring excellent transparency even when a voltage is not applied may be manufactured by selecting a liquid crystal compound satisfying Formula 1. In Formula 4, in another example, b may be 0.1 to 0.9, 0.1 to 0.7, 0.1 to 0.5 or 0.1 to 0.3.

The liquid crystal compound may also have a difference between extraordinary dielectric anisotropy (dielectric anisotropy in a major axis direction; $\varepsilon_e$) and ordinary dielectric anisotropy (dielectric anisotropy in a minor axis direction; $\varepsilon_o$) of 3 or more, 3.5 or more, 4 or more, 6 or more, 8 or more, or 10 or more. When the liquid crystal compound has such dielectric anisotropy, an element having an excellent driving voltage property may be provided. As the difference in dielectric anisotropy is high, the element can exhibit a suitable property, and thus the upper limit of the difference is not particularly limited. For example, as the liquid crystal compound, a compound having extraordinary dielectric anisotropy (dielectric anisotropy in a major axis direction; $\varepsilon_e$) of approximately 6 to 50, and ordinary dielectric anisotropy (dielectric anisotropy in a minor axis direction; $\varepsilon_o$) of approximately 2.5 to 7 may be used.

The "dye" used herein may mean a material which may intensively absorb and/or transform light in at least a partial or entire range of a visible region, for example, a wavelength range of 400 to 700 nm, and the "anisotropic dye" used herein may mean a material which enables anisotropic absorption of light in at least a partial or entire range of the visible region. A light transmittance of the optical element may be controlled using the anisotropic dye. The anisotropic dye may be, but is not particularly limited, for example, a black dye or a color dye. The anisotropic dye may have a dichroic ratio, that is, a value obtained by dividing the absorption of polarized light parallel to the major axis of the anisotropic dye by the absorption of polarized light parallel to a direction vertical to the major axis direction of 5 or more, 6 or more, or 7 or more. The dye may satisfy the dichroic ratio in the wavelength range in a visible region, for example, at at least some or one wavelength in a range of approximately 380 to 700 nm or 400 to 700 nm. The upper limit of the dichroic ratio may be, for example, approximately 20, 18, 16 or 14. The type of the anisotropic dye is not particularly limited, and for example, may include all types of dyes known to have the above-described properties and to be aligned according to the alignment of the liquid crystal compound.

In the optical element of the present application, anisotropic light absorption with respect to polarized light in a direction parallel to the arrangement direction of the anisotropic dye and polarized light in a direction vertical to the arrangement direction of the anisotropic dye may be controlled by controlling the alignment of the liquid crystal compound and/or anisotropic dye present in the liquid crystal layer. For example, the alignment of the liquid crystal compound and/or anisotropic dye in the liquid crystal layer may be controlled by the application of an external signal, and thus in the liquid crystal layer, the anisotropic light absorption may be controlled by the application of an external signal. The liquid crystal layer having such a property may be referred to as an active polarizer, and as will be described below, a total transmittance of the optical element may be controlled by controlling the relationship between a transmission axis and/or absorption axis of the polarizing layer by the application of an external signal.

In one example, in the liquid crystal layer, a polarizing property may be controlled by switching the alignment state of the liquid crystal compound and/or anisotropic dye to a homogeneous alignment state, a tilted alignment state or a homeotropic alignment state.

In the specification, the homogeneous alignment may refer to the case in which an optical axis of the liquid crystal layer has a tilt angle of approximately 0 to 15, 0 to 10, or 0 to 5 degrees to a plane of the liquid crystal layer. In addition, in the specification, the homeotropic alignment may refer to the case in which an optical axis of the liquid crystal layer has a tilt angle of approximately 90 to 85 degrees to a plane of the liquid crystal layer. In addition, in the specification, the tilted alignment may refer to the case in which an optical axis of the liquid crystal layer has a tilt angle, other than that for the homogenous alignment or homeotropic alignment, with respect to a plane of the liquid crystal layer, and the tilt angle may be, for example, approximately more than 15 degrees to less than 85 degrees with respect to a plane of the liquid crystal layer. In the specification, the term "optical axis" may be a slow axis when incident light passes through a corresponding region, a major axis direction of a rod when the liquid crystal compound is formed in a rod shape, or a normal line direction of a disc surface when the liquid crystal compound is formed in a discotic shape.

In addition, here, the homogeneous alignment, tilted alignment or homeotropic alignment of the liquid crystal layer refers to substantial homogeneous alignment, tilted alignment or homeotropic alignment capable of controlling light transmittance of a desired optical element, and in this case, the in-plane retardation and the thickness retardation of the liquid crystal layer are not particularly limited.

In another example, the optical element may include a structure in which the polarizing layer is present on one surface of the liquid crystal layer as described above, and a structure in which the liquid crystal layer is present between two polarizing layers facing each other, and in this case, the liquid crystal layer may have a thickness retardation which will be described below in a predetermined range in a homogeneous alignment state, provided that a light transmittance is suitably controlled, and have an in-plane retardation in a predetermined range in a homeotropic alignment state. However, the in-plane retardation and the thickness retardation are not limited to the following ranges.

Here, when the liquid crystal compound and/or anisotropic dye in the liquid crystal layer is homogeneously aligned, an in-plane retardation (Rin) of a liquid crystal cell may be, for example, 10 nm or more, 20 nm or more, 30 nm or more, 40 nm or more, 50 nm or more, 60 nm or more, 70 nm or more, 80 nm or more, 90 nm or more, 100 nm or more, 110 nm or more, 120 nm or more, 130 nm or more, or 140 nm or more. In addition, in a state in which a voltage is not applied, the upper limit of the in-plane retardation of the liquid crystal layer may be 300 nm or less, 290 nm or less, 280 nm or less, 270 nm or less, 260 nm or less, 250 nm or less, 240 nm or less, 230 nm or less, 220 nm or less, 210 nm or less, 200 nm or less, 190 nm or less, 180 nm or less, 170 nm or less, or 160 nm or less. In addition, when the liquid crystal compound and/or anisotropic dye is homeotropically aligned by the application of a voltage, a thickness retardation (Rth) of the liquid crystal layer may be, for example, 10 nm or more, 20 nm or more, 30 nm or more, 40 nm or more, 50 nm or more, 60 nm or more, 70 nm or more, 80 nm or more, 90 nm or more, 100 nm or more, 110 nm or more, 120 nm or more, 130 nm or more, or 140 nm or more. In addition, when a voltage is applied, the upper limit of the thickness retardation of the liquid crystal layer may be approximately 300 nm or less, 290 nm or less, 280 nm or less, 270 nm or less, 260 nm or less, 250 nm or less, 240 nm or less, 230 nm or less, 220 nm or less, 210 nm or less, 200 nm or less, 190 nm or less, 180 nm or less, 170 nm or less, or 160 nm or less.

The term "in-plane retardation (Rin)" used herein is a value calculated by General Formula 1, and the term "thickness retardation (Rth)" used herein is a value calculated by General Formula 2.

$$Rin=(nx-ny)\times d \qquad \text{[General Formula 1]}$$

$$Rth=(nz-ny)\times d \qquad \text{[General Formula 2]}$$

In General Formulas 1 and 2, reference marks "nx, ny, nz and d" denote a refractive index in an in-plane slow axis direction of the liquid crystal layer, a refractive index in an in-plane fast axis direction of the liquid crystal layer, a refractive index in a thickness direction and a thickness of the liquid crystal layer, respectively. Each refractive index may be a refractive index measured to light having a wavelength of, for example, 550 nm. Accordingly, an optical element which can realize a transmission mode when a voltage is not applied and a blocking mode when a voltage is applied may be manufactured. An alignment state and a phase difference according to the alignment state of the liquid crystal compound and/or anisotropic dye in the liquid crystal layer when a voltage is applied or not applied may be freely controlled to exhibit an effect of suitably controlling a light transmittance according to a use to which the optical element is applied.

In one example, in an initial state, the liquid crystal compound and/or anisotropic dye in the liquid crystal layer may be present in an aligned state such that an optical axis of the liquid crystal layer has a tilt angle of 0 to 90 degrees to a plane of the liquid crystal layer. The "initial state" used herein may refer to a state in which an external signal capable of affecting the alignment of the liquid crystal compound and/or anisotropic dye is not applied. In one specific example, in the initial state, the liquid crystal compound and/or anisotropic dye may be present in a homogeneous or homeotropic alignment state.

In addition, in the initial state, the liquid crystal compound and/or anisotropic dye may be present in an aligned state such that an optical axis of the liquid crystal layer has an angle of 0 to 90 degrees with respect to an absorption axis of the polarizing layer. In one example, even when the liquid crystal layer is present in a homogeneous alignment state, a transmittance of the optical element may be controlled by controlling an angle between a direction of the optical axis of the liquid crystal layer and a direction of the absorption axis of the polarizing layer. In one example, when the angle between the directions of the optical axis of the liquid crystal layer and the absorption axis of the polarizing layer is in vertical, the transmittance of the optical element may be decreased, and when the angle between the directions of the optical axis of the liquid crystal layer and the absorption axis of the polarizing layer is in parallel, the transmittance of the optical element may be increased.

Here, the liquid crystal compound and/or anisotropic dye may be present in an aligned state to form an angle to the absorption axis of a polarizing plate, or for example, present in an aligned state to be parallel to the absorption axis of the polarizing plate or present in a twisted alignment state. The "twisted alignment state" used herein may be a state in which a major axis of the liquid crystal compound and/or anisotropic dye is parallel to a plane of the liquid crystal layer, but a direction of the major axis of an adjacent liquid crystal compound and/or anisotropic dye is twisted by slightly changing the angle. In addition, a driving mode of the liquid crystal layer is not particularly limited, provided that the above-described alignment property of the liquid crystal compound and/or anisotropic dye is exhibited. For example, the liquid crystal layer may be driven in an electrically controlled birefringence (ECB) mode, a twisted nematic (TN) mode, or a super twisted nematic (STN) mode, but the present application is not limited thereto.

As described above, the alignment of the liquid crystal compound and/or anisotropic dye of the liquid crystal layer in the initial state may be switched by the application of an external signal. In one example, when an external signal is applied to the liquid crystal layer aligned in a homogeneous alignment state in the initial state, the alignment state of the liquid crystal layer may be switched into a homeotropic alignment state by the application of an external signal, thereby increasing a transmittance, and when an external signal is applied to the liquid crystal layer aligned in a homeotropic alignment state in the initial state, the alignment state of the liquid crystal layer may be switched into a homogeneous alignment state, thereby reducing a transmittance. In addition, to switch the initial homeotropic alignment state into the homogeneous alignment state, to determine the alignment direction of the liquid crystal compound and/or anisotropic dye, a pre-tilt in a predetermined direction may be needed. Here, a method of providing a pre-tilt is not particularly limited, and for example, a desired pre-tilt may be provided by disposing a suitable alignment film.

Here, when the liquid crystal compound and/or anisotropic dye of the liquid crystal layer is in a homeotropic alignment state, the alignment direction of the anisotropic dye is perpendicular to the plane of the polarizing layer present below, and thus light passing through the polarizing layer may not be absorbed to and may pass through the anisotropic dye of the liquid crystal layer, and thus the transmittance of the optical element may be increased. Meanwhile, when the liquid crystal compound and/or anisotropic dye of the liquid crystal layer is in a homogeneous alignment state, the alignment state of the anisotropic dye is parallel to the plane of the underlying polarizing layer. Therefore, when the alignment direction of the optical axis of the liquid crystal layer is disposed to have a predetermined angle with respect to the absorption axis of the polarizing layer, a part of the light passing through the polarizing layer may be absorbed to the anisotropic dye, and thus the transmittance of the optical element may be decreased.

In one example, the optical element may be switched between the transmission mode and the blocking mode according to whether an external signal is applied to the liquid crystal layer. The optical element may be switched, for example, between the transmission mode in which a transmittance in a visible region is 20% or more and the blocking mode in which a transmittance in a visible region is 3% or less by the application of an external signal to the liquid crystal layer. However, the light transmittances in the transmission mode and the blocking mode are not limited to the above values, and as described above, more various ranges of light transmittance may be controlled by controlling the alignment property of the liquid crystal compound and/or anisotropic dye.

In one example, when the liquid crystal layer is in a homogeneous alignment state in the initial state, the alignment direction of the optical axis of the liquid crystal layer is formed to have a predetermined angle to the absorption axis of the polarizing layer, and thus a blocking mode may be realized. When the liquid crystal layer is converted into a homeotropic alignment state by the application of an external signal, the transmittance of the optical element may be increased, and thus a transmission mode may be realized. In another example, when the liquid crystal layer is in a homeotropic alignment state in the initial state, the optical element may realize a transmission mode in the initial state, and when the liquid crystal layer is converted into a homogeneous alignment state according to the above-described pre-tilt by the application of an external signal, the alignment direction of the optical axis of the liquid crystal layer may have a predetermined angle to the absorption axis of the polarizing layer, and thus a blocking mode of the optical element may be realized.

The optical element may further include an alignment film adjacent to the liquid crystal layer to control an initial alignment state of the liquid crystal compound and/or anisotropic dye. As the alignment film, a known homeotropic or homogenous alignment film may be used without particular limitation. Such an alignment film may include a touch-type alignment film such as a rubbing alignment film or an alignment film comprising a photo-alignment compound known to exhibit an alignment property by a non-touch type method, for example, the application of linear polarized light may be used.

Here, when the liquid crystal layer is driven in a TN or STN mode, the liquid crystal layer may further include a chiral agent. The chiral agent may induce molecular arrangement of the liquid crystal compound and/or anisotropic dye to have a spiral structure. As the chiral agent, any one that can induce a desired spiral structure without damaging nematic regularity may be used without particular limitation. The chiral agent for inducing a spiral structure to liquid crystals needs to at least include chirality in a molecular structure. As the chiral agent, for example, a compound having one or at least two asymmetric carbons, a compound having an asymmetric point on a hetero atom such as a chiral amine or chiral sulfoxide, or a compound having an axially asymmetric optically active site such as cumulene or binaphthol may be used. The chiral agent may be, for example, a low molecular compound having a molecular weight of 1,500 or less. As the chiral agent, commercially available chiral nematic liquid crystals, for example, chiral dopant liquid crystals S-811 manufactured by Merck or LC756 manufactured by BASF may be used.

The liquid crystal layer may further include a pillar pattern. More specifically, the liquid crystal layer may further include a pillar pattern formed to maintain a gap between two adjacent layers present on and under the liquid crystal layer. When the liquid crystal layer is present between the polarizing plate and the composite layer, the lower and upper layers may be the polarizing plate and the composite layer, and when the liquid crystal layer is present between two composite layers, the lower and upper layers may be two composite layers. The liquid crystal compound and/or anisotropic dye may be present in a region in which the pillar pattern is not present. The pillar pattern may be formed on one of the upper and lower layers adjacent to the liquid crystal layer, and attached to the other layer using an adhesive. The adhesive capable of attaching the pillar pattern and the composite layer may be present on a pillar surface of the pillar pattern, and a type of the adhesive is not particularly limited, and thus any known adhesive for laminating optical elements may be used.

The pillar pattern may include a curable resin. A type of the curable resin may be, but is not particularly limited to, a heat-curable resin or a photocurable resin such as a UV curable resin. As the heat-curable resin, for example, a silicone resin, a silicon resin, a furan resin, a polyurethane resin, an epoxy resin, an amino resin, a phenol resin, an urea resin, polyester resin or a melamine resin may be used, but the present application is not limited thereto. As a representative example of the UV curable resin, an acrylic polymer such as a polyester acrylate polymer, a polystyrene acrylate polymer, an epoxy acrylate polymer, a polyurethane acrylate polymer or a polybutadiene acrylate polymer, a silicone acrylate polymer or an alkyl acrylate polymer may be used, but the present application is not limited thereto.

A shape and an arrangement type of the pillar pattern may be suitably designed without damaging the object of the present application, for example, to maintain a predetermined gap between the two composite layers. The pillar pattern may be present to space one or at least two pillar shapes apart from each other, or to divide a space as partitions do. A width of the pillar, a gap between the pillars, a thickness of the pillar, and an area ratio of the pillar pattern in the liquid crystal layer may be suitably selected without damaging the object of the present application. For example, the width of the pillar may be 1 μm to 500 μm, the gap between the pillars may be 10 μm to 5000 μm, and the area ratio of the pillar pattern in the liquid crystal layer may be approximately 0.1% to 50% with respect to 100% of the area of the liquid crystal layer. In addition, a height of the pillar may be suitably selected in a similar range to the thickness of the liquid crystal layer in consideration of the thickness of the liquid crystal layer.

Hereinafter, the composite layer will be described in detail. The composite layer may sequentially include a first oxide layer, a metal layer and a second oxide layer. The composite layer may serve as an electrode layer capable of applying an external signal such as a voltage, to the liquid crystal layer. The composite layer has excellent transparency, since the composite layer has a high light transmittance in a visible region, and the composite layer enables to block heat, since the composite layer has a low light transmittance in an infrared region and also the composite layer has a high electrical conductivity and a low sheet resistance value. Accordingly, such a composite layer can save energy, and can be very usefully employed as an electrode layer of the optical element.

The composite layer may have a transmittance of 80% or more, 85% or more or 90% or more with respect to light with a wavelength in a visible region, for example, in a range of approximately 400 to 700 nm, or light with a wavelength of 550 nm. The composite layer may be usefully employed as an electrode layer of the optical element satisfying the above-described numerical range. However, the light transmittance in the visible region of the composite layer is not limited to the above numerical range, and may have a light transmittance in the visible region to be conventionally available as a transparent electrode.

The composite layer may have a transmittance of 70% or less, 65% or less or 60% or less with respect to light with a wavelength in an infrared region, for example, in a range of approximately 700 to 1000 nm, or light with a wavelength of 780 nm or more. Since the composite layer satisfying the numerical range can block heat in an infrared region, energy can be saved. The lower limit of the light transmittance in the infrared region of the composite layer is not particularly limited, but may be, for example, when being used as an electrode layer of a smart window, 0 to 5%.

The composite layer may have a sheet resistance of 20Ω/□ or less, 15Ω/□ or less or 10Ω/□ or less, and the lower limit may be, but is not particularly limited to, 0.1Ω/□ or more. When the composite layer having a sheet resistance in the above numerical range is applied to the optical element, power consumption may be minimized, and thus the efficiency of the optical element may be increased.

The properties of the composition layer, for example, the light transmittances in the visible and/or infrared region(s) and the sheet resistance may be controlled by, for example, refractive indexes, thicknesses, electrical conductivities or materials of the first oxide layer, the metal layer and the second oxide layer. The "oxide layer" used herein may be a layer including an oxide as a main component, and the "metal layer" used herein may be a layer including a metal as a main component. The oxide layer may be a layer including an oxide at approximately 80 wt % or more, and the metal layer may be, for example, a layer including a metal at approximately 80 wt % or more.

In one example, the refractive index of the first oxide layer may be higher than that of the second oxide layer, and the refractive index of the metal layer may be lower than that of the second oxide layer.

In one example, the metal layer may have a refractive index of 0.1 to 1.0 with respect to light with a wavelength of 550 nm. More particularly, the metal layer may have a refractive index of 0.1 or more, 0.15 or more, 0.2 or more, 0.25 or more, 0.3 or more, 0.35 or more, 0.4 or more, 0.45 or more or 0.5 or more, and 1.0 or less, 0.95 or less, 0.9 or less, 0.85 or less, 0.8 or less, 0.75 or less, 0.7 or less, 0.65 or less, 0.6 or less or 0.55 or less with respect to light with a wavelength of 550 nm.

In addition, the first oxide layer may have a refractive index of 1.2 to 2.8 or 1.9 to 2.75, and more specifically, 1.2 or more, 1.25 or more, 1.3 or more, 1.35 or more, 1.4 or more, 1.45 or more, 1.5 or more, 1.55 or more, 1.6 or more, 1.65 or more, 1.7 or more, 1.75 or more, 1.8 or more, 1.85 or more, 1.9 or more, 1.95 or more or 2.0 or more, and 2.8 or less, 2.75 or less, 2.7 or less, 2.65 or less, 2.6 or less, 2.55 or less, 2.5 or less, 2.45 or less, 2.4 or less, 2.35 or less, 2.3 or less, 2.25 or less, 2.2 or less, 2.15 or less, 2.1 or less or 2.05 or less with respect to light with a wavelength of 550 nm.

In addition, the second oxide layer may have a refractive index of 1.5 to 2.5 with respect to light with a wavelength of 550 nm. More specifically, the second oxide layer may have a refractive index of 1.5 or more, 1.55 or more, 1.6 or more, 1.65 or more, 1.7 or more, 1.75 or more, 1.8 or more, 1.85 or more, 1.9 or more, 1.95 or more or 2.0 or more, and 2.5 or less, 2.45 or less, 2.4 or less, 2.35 or less, 2.3 or less, 2.25 or less, 2.2 or less, 2.15 or less, 2.1 or less or 2.0 or less with respect to light with a wavelength of 550 nm. The refractive index may be measured using, for example, an M-2000 apparatus [Manufacturer: J. A. Woollam Co., Inc. (USA)].

When each of the metal layer, the first oxide layer and the second oxide layer satisfy the range of the refractive index, the composite layer has a high light transmittance in a visible region and a low light transmittance in an infrared region, and therefore, may be usefully employed in an energy saving-type optical element as a transparent electrode layer.

While a method of controlling the refractive indexes of the metal layer, the first oxide layer and the second oxide layer in the above range is not particularly limited, the method may be controlled by, for example, controlling a thickness of each layer or a condition of a deposition process for each layer. Specifically, a degree of crystallization may be controlled by controlling the deposition condition for each layer, and therefore, even with the same thickness and material, the refractive indexes may be different from each other. The deposition process may be performed by a known deposition method, for example, sputtering. More specifically, the first oxide layer and the second oxide layer may be deposited by, for example, RF sputtering, and the metal layer may be deposited by, for example, DC sputtering.

In one example, the thickness of the metal layer may be in a range of 5 nm to 20 nm. More specifically, the thickness of the metal layer may be 5 nm, 6 nm or more, 7 nm or more, 8 nm or more, 9 nm or more, 10 nm or more, 11 nm or more or 12 nm or more, and 20 nm or less, 19 nm or less, 18 nm or less, 17 nm or less, 16 nm or less, 15 nm or less, 14 nm or less or 13 nm or less. When thickness of the metal layer is in the above range, it is easy to control the refractive index of the metal layer in the above-described range. In addition, when the thickness of the metal layer is in the above range, it is easy to form a continuous film of the metal layer, and thus an excellent electrical conductivity and a low resistance may be realized, and a light transmittance in a visible region of the optical element may be increased.

The metal layer may also include a conductive metal having a sheet resistance of 20Ω/□ or less, and preferably, 10Ω/□ or less. When the electrical conductivity of the conductive metal included in the metal layer is in the above range, a sheet resistance value of the composition layer may be reduced, and thus the efficiency of the optical element may be increased.

The metal layer may include a metal such as silver (Ag), aluminum (Al), platinum (Pt), copper (Cu) or gold (Au). The metal layer may include, for example, silver. In this case, in a process of manufacturing the composite layer or a process of using the composite layer included in the optical element, in contact with an air and moisture, a part of silver oxide may be included in the metal layer. When the metal layer includes silver and silver oxide, the silver oxide may be included at 0.1 wt % or more and 50 wt % or less with respect to 100 wt % of the metal layer.

In one example, the thickness of the first oxide layer may be in a range of 20 nm to 60 nm or 40 nm to 50 nm. More specifically, the thickness of the first oxide layer may be 20 nm or more, 25 nm or more, 30 nm or more, 35 nm or more or 40 nm or more, and 60 nm or less, 55 nm or less, 50 nm or less or 45 nm or less. When the thickness of the first oxide layer is in the above range, it is easy to control the transmittance to light or refractive index of the first oxide layer in the above range, and thus a defect rate of the deposition of the metal layer formed on the first oxide layer may be decreased.

In one example, the thickness of the second oxide layer may be 10 nm to 100 nm, and preferably, 20 nm to 60 nm. More specifically, the thickness of the second oxide layer may be 10 nm or more, 15 nm or more, 20 nm or more, 25 nm or more, 30 nm or more, 35 nm or more, 40 nm or more, 45 nm or more or 50 nm or more, and 100 nm or less, 95 nm or less, 90 nm or less, 85 nm or less, 80 nm or less, 75 nm or less, 70 nm or less, 65 nm or less, 60 nm or less, or 55 nm or less. When the thickness of the second oxide layer is in the above range, it is easy to control the transmittance to light or refractive index of the second oxide layer in the above range, and an excellent electrical conductivity and a low resistance value may be obtained.

For example, the second oxide layer may have a resistivity in a range of $1.0 \times 10^{-5}$ Ωcm to $1.0 \times 10^{5}$ Ωcm, and preferably, $1.0 \times 10^{-4}$ Ωcm to $1.0 \times 10^{4}$ Ωcm. When the resistivity of the second oxide layer is in the above range, the sheet resistance of the composite layer may be decreased, and thus the efficiency of the optical element may be increased.

Each of the first oxide layer and the second oxide layer may include a metal oxide including at least one metal selected from the group consisting of antimony (Sb), barium (Ba), gallium (Ga), germanium (Ge), hafnium (Hf), indium (In), lanthanum (La), magnesium (Mg), selenium (Se), silicon (Si), tantalum (Ta), titanium (Ti), vanadium (V), yttrium (Y), zinc (Zn) and zirconium (Zr).

Here, the second oxide layer may further include at least one second metal selected from the group consisting of gallium (Ga), aluminum (Al), zirconium (Zr), titanium (Ti), niobium (Nb), tantalum (Ta), indium (In) and vanadium (V).

A metal included in the second oxide layer may be a doping material. Since the second oxide layer may further include the second metal, when used as an electrode layer in the optical element, electron mobility may be improved. Since the second oxide layer has a high refractive property like the first oxide layer, the light transmittance in the visible region of the composite layer may be increased, and the light transmittance in the infrared region of the composite layer may be decreased through an optical design. In addition, since the second oxide layer has an electrical conductivity, the electrical conductivity of the metal layer is not inhibited, and the composite layer may serve as a transparent electrode having a low emissivity (Low-E) function in various optical elements.

The content of the second metal in the second oxide layer may be 0.1 wt % or more and 10 wt % or less. The refractive index of the second oxide layer may be changed by, for example, the content of the second metal. Accordingly, to realize the maximum light transmittance in the visible region of the composite layer, it is necessary to control the content of the second metal in the second oxide layer. In addition, the second metal included in the second oxide layer affects the electrical conductivity of the second oxide layer. When the content of the second metal in the second oxide layer satisfies the above range, the second oxide layer may realize the optimal refractive index and electrical conductivity.

The thickness of the composite layer may be suitably selected without damaging the object of the present application. The thickness of the composite layer may be controlled in a range of 50 nm to 300 nm or 70 nm to 200 nm, for example, to exhibit a high light transmittance in a visible region, a low light transmittance in an infrared region, excellent electrical conductivity and a low resistance property.

The composite layer may further include a base layer, and for example, the first oxide layer may be adjacent to the base layer. As the base layer, a known material may be used without particular limitation. For example, an inorganic film such as a glass film, a crystalline or amorphous silicon film, a quartz or indium tin oxide (ITO) film, or a plastic film may be used. As the base layer, an optically isotropic base layer, an optically anisotropic base layer or polarizing plate such as a retardation layer, or a color filter substrate may be used. For example, when the polarizing plate is present on an inner surface of the base layer, that is, between the liquid crystal layer and the base layer, although an anisotropic base layer is used as the base layer, a device having a suitable performance may be realized.

As a plastic base layer, a base layer including triacetyl cellulose (TAC); a cyclic olefin polymer (COP) such as a norbornene derivative; poly(methyl methacrylate) (PMMA); polycarbonate (PC); polyethylene (PE); polypropylene (PP); polyvinyl alcohol (PVA); diacetyl cellulose (DAC); polyacrylate (Pac); polyethersulfone (PES); polyetheretherketone (PEEK); polyphenylsulfone (PPS), polyetherimide (PEI); polyethylene naphthalate (PEN); polyethylene terephthalate (PET); polyimide (PI); polysulfone (PSF); polyarylate (PAR) or an amorphous fluorine resin may be used, but the present application is not limited thereto. When needed, a coating layer of gold, silver, or a silicon compound such as silicon dioxide or silicon monoxide, or a coating layer of a reflection-preventing layer may be present on the base layer.

In the present application, the second oxide layer may be present closer to the liquid crystal layer than the first oxide layer. In addition, the composite layer may be present on both sides of the liquid crystal layer. That is, the liquid crystal layer may be disposed between two composite layers facing each other. In this case, the composite layers present on both sides of the liquid crystal layer may have the same structure having the same refractive index, thickness or sheet resistance, or an independent structure having a different refractive index, thickness or sheet resistance.

The present application is also directed to providing a use of the optical element. The optical element of the present application may have a variable transmittance according to the application of an external signal. Also, since the optical element may apply the external signal by using a composite layer having a low transmittance to light in an infrared region, the optical element may block heat, and save energy. Such an optical element may be applied to various optical devices. The optical element of the application invention may be applied to, for example, a sunroof.

The "sunroof" used herein may be a fixed or operating (venting or sliding) opening present on the roof of an automobile, and include all types of devices serving to input light or fresh air into the automobile. In the present application, an operation type of the sunroof is not particularly limited. For example, the sunroof may be operated manually or by a motor, and a shape, a size or a style of the sunroof may be suitably selected according to a desired use. For example, the sunroof may be, but is not limited to, a pop-up type sunroof, a spoiler (tile & slide) type sunroof, an in-built type sunroof, a folding type sunroof, a top-mount type sunroof, a panoramic roof system type sunroof, a removable roof panels (t-tops or targa roofs) type sunroof or a solar type sunroof according to an operation mode.

The exemplary sunroof of the present application may include the optical element, and in this case, details of the optical element may be the same as described in the item of the optical element.

The sunroof may further include a UV blocking layer. The "UV blocking layer" used herein may be a known functional layer having a UV blocking function. The UV blocking layer may be formed on one or both surfaces of a polarizing layer, a liquid crystal layer or a composite layer. For example, UV blocking layers 201A or 201B may be present on outermost surfaces of the sunroof as shown in FIG. 2. Such a UV blocking layer may be, for example, a UV blocking pressure-sensitive adhesive or a UV blocking film. As the UV blocking pressure-sensitive adhesive, one prepared by adding a known additive having a UV blocking function to a component of a known pressure-sensitive adhesive may be used. As the UV blocking film, for example, one prepared by forming a layer including a known additive having a UV blocking function on one surface of a known pressure-sensitive adhesive may be used. As the UV blocking pressure-sensitive adhesive, for example, EW1501-D1-UV, EW1502-D1-UV or EW1504-D1-UV manufactured by DAIO Paper may be used, but the present application is not limited thereto.

Effects of Invention

The optical element may have a variable transmittance by whether an external signal is applied or not. Also, since the optical element may apply the external signal by using a composite layer having a low transmittance to light in an infrared region, the optical element may block heat, and save energy. Such an optical element may be usefully employed in various optical devices, for example, a sunroof.

BRIEF DESCRIPTION OF DRAWINGS

FIG. 1 shows an exemplary optical element;
FIG. 2 shows an exemplary structure of a sunroof;
FIG. 3 shows an exemplary structure of an optical element of Example 1;
FIG. 4 shows a transmittance of the optical element according to a driving voltage of Example 1;
FIG. 5 shows a transmittance and a reflectance of the optical element of Example 1;
FIG. 6 shows a transmittance and a reflectance of an optical element of Comparative Example 1;
FIG. 7 shows properties of a metal layer according to a wavelength according to Example 1 and Comparative Example 2; and
FIG. 8 shows an evaluation result for light transmittance according to refractive indexes of a first metal oxide layer and a second metal oxide layer.

DETAILED DESCRIPTION OF EXEMPLARY EMBODIMENTS

Hereinafter, the above-described contents will be described in detail with reference to Examples and Comparative Examples. However, the scope of the present application is not limited to the following descriptions.

Example 1

Manufacture of Composite Layer

A first metal oxide layer was formed by depositing $CeO_2$ on a glass substrate to a thickness of 35 nm using RF sputtering. A composite layer was manufactured by depositing a metal layer consisting of Ag on the first metal oxide layer to a thickness of 10 nm using a DC sputtering method under conditions of 1.5 W/cm$^2$ and 3 mTorr, and depositing a Ga-doped zinc oxide (GZO) layer as a second metal oxide layer on the metal layer to a thickness of 45 nm.

In this case, as a result obtained by measuring the refractive index of each layer using an M-2000 apparatus [Manufacturer: J. A. Woollam Co., Inc. (USA)], the refractive index of the first oxide layer nm was 2.34 at a wavelength of 550 nm, the refractive index of the metal layer was 0.19 at a wavelength of 550 nm, and the refractive index of the zinc oxide layer was 1.94 at a wavelength of 550 nm.

In addition, as a result obtained by measuring a visible ray transmittance of the composite layer using a UV-vis spectrometer, a transmittance was 87.2% at a wavelength of 550 nm.

Moreover, a sheet resistance of the composite layer measured using a sheet resistance meter was less than 10 Ω/□.

Manufacture of Optical Element for Sunroof

An optical element for a sunroof having a structure shown in FIG. 3 was manufactured according to the following method. The optical element was manufactured by stacking a first composite layer 103A manufactured by the same method as described above on a known absorption-type linear polarizing layer 101 using an OCA layer 301 (EW1501-D1-UV, DAIO Paper) such that the first oxide layer of the manufactured composite layer is in contact with a surface of the OCA, forming a liquid crystal layer 102 including a liquid crystal compound (HPC21600, HCCH) and an anisotropic dye (X12, BASF) in a ratio of 1 to 3 parts by weight with respect to 100 parts by weight of the liquid crystal compound on the second oxide layer of the composite layer, and stacking a second composite layer 103B manufactured by the same method as described above such that the second oxide layer of the composite layer is in contact with the liquid crystal layer. Here, the liquid crystal layer is formed such that the an optical axis of the liquid crystal layer has a tilt angle of approximately 0 to 15 degrees to a plane of the liquid crystal layer, that is, the liquid crystal compound and/or anisotropic dye was homogeneously aligned. Also, the liquid crystal layer is formed such that the optical axis of the liquid crystal layer has an angle of approximately 90 degrees to an absorption axis of the absorption-type linear polarizing layer.

Example 2

A sunroof of Example 2 was manufactured by the same method as described in Example 1, except that the composite layer manufactured by the following method was used as a composite layer.

Manufacture of Composite Layer

A first metal oxide layer was formed by depositing $CeO_2$ on a glass substrate to a thickness of 30 nm using RF sputtering. A composite layer was manufactured by depositing a metal layer consisting of Ag on the first metal oxide layer to a thickness of 10 nm by DC sputtering under conditions of 1.5 W/cm$^2$ and 3 mTorr, and depositing a Al-doped zinc oxide (AZO) layer on the metal layer as a second metal oxide layer to a thickness of 50 nm.

In this case, the refractive index of the first metal oxide layer was 2.34 at a wavelength of 550 nm, the refractive index of the metal layer was 0.19 at a wavelength of 550 nm, and the refractive index of the second metal oxide layer was 1.89 at a wavelength of 550 nm. In addition, as a result obtained by measuring a visible ray transmittance of the composite layer using an UV-vis spectrometer, a transmittance was 85.5% at a wavelength of 550 nm. In addition, a sheet resistance of the composite layer measured using a sheet resistance meter was less than 10 Ω/□.

Comparative Example 1

A sunroof of Comparative Example 1 was manufactured by the same method as described in Example 1, except that an ITO transparent electrode layer was used as a composite layer.

Comparative Example 2

A sunroof of Comparative Example 2 was manufactured by the same method as described in Example 1, except that the composite layer manufactured by the following method was used as a composite layer.

Manufacture of Composite Layer

A first metal oxide layer was formed by depositing $CeO_2$ on a glass substrate to a thickness of 35 nm using RF sputtering. A composite layer was manufactured by depositing a metal layer consisting of Ag on the first metal oxide layer to a thickness of 10 nm by DC sputtering under conditions of 0.5 W/cm$^2$ and 15 mTorr, and depositing a Ga-doped zinc oxide (GZO) layer on the metal layer as a second metal oxide layer to a thickness of 45 nm.

In this case, the refractive index of the first metal oxide layer was 2.34 at a wavelength of 550 nm, the refractive index of the metal layer was 1.95 at a wavelength of 550 nm, and the refractive index of the zinc oxide layer was 1.94 at a wavelength of 550 nm.

In addition, a sheet resistance of the metal layer measured by a sheet resistance meter was more than 10Ω/□, a visible ray transmittance at a wavelength of 550 nm of the metal layer using an UV-vis spectrometer was 46.8% and a refractive index was 1.95. In addition, a visible ray transmittance of the composite layer using a UV-vis spectrometer was 79.1% at a wavelength of 550 nm, and a sheet resistance of the composite layer measured using a sheet resistance meter was more than 10 Ω/□.

Comparative Example 3

A sunroof of Comparative Example 3 was manufactured by the same method as described in Example 2, except that a first metal oxide layer was formed to a thickness of 10 nm, and a second metal oxide layer was formed to a thickness of 80 nm in the manufacture of a composite layer.

A visible ray transmittance of the composite layer measured using a UV-vis spectrometer was 72.6% at a wavelength of 550 nm.

In addition, a sheet resistance of the composite layer measured by a sheet resistance meter was more than 10 Ω/□.

Evaluation Example 1

In the optical element manufactured in Example 1, the liquid crystal layers were formed to thicknesses of 10 μm and 15 μm, respectively, and transmittances of the optical element to light with a wavelength of approximately 550 nm according to a driving voltage were measured using a haze meter [NDH 5000SP; Nippon Denshoku (Japan)] after connecting a power supply capable of applying a perpendicular electric field to the composite layer. The result is shown in FIG. 4. As shown in FIG. 4, it can be seen that, when a voltage was not applied, a low transmittance was shown, and as a voltage was applied, the liquid crystal compound and the anisotropic dye were converted into a vertical aligned state, and a transmittance increased.

Evaluation Example 2: Evaluation of Transmittance and Reflectance

The transmittances and reflectances of the optical element manufactured in Examples and Comparative Examples were measured at a state in which the voltage is not applied. Specifically, the transmittances and reflectances were measured using a Solid Spec-3700 [Manufacturer: Shimadzu (Japan)], and shown in FIG. 5 (Example 1) and FIG. 6 (Comparative Example 1). As shown in FIGS. 5 and 6, it was confirmed that the optical element of Example using the composite layer of the present application as a transparent electrode layer showed a similar light transmittance in a visible region but a considerably low light transmittance in an infrared region, compared to the optical element in Comparative Example 1 using an ITO transparent electrode layer.

Evaluation Example 3: Evaluation of Refractive Indexes and Absorption Coefficients of Metal Layers According to Wavelengths The refractive indexes and absorption coefficients of the metal layers manufactured in Example 1 and Comparative Example 2 were evaluated according to wavelength, and shown in FIG. 7. In FIG. 7, n means a refractive index of the metal layer according to a wavelength of light, λ means a wavelength of light, and k means an absorption coefficient of the metal layer according to a wavelength of light. As shown in FIG. 7, it was confirmed that, although the metal layer was formed to the same thickness, the refractive index and the absorption coefficient were different according to a condition for forming the metal layer.

Evaluation Example 4: Evaluation of Transmittance of Composite Layer According to Refractive Indexes of First and Second Metal Oxide Layers An optical element was manufactured by the same method as Examples 1 and 2, and the transmittance of the composite layer with respect to light having a wavelength of 550 nm according to refractive indexes of the first and second metal oxide layers was evaluated by changing refractive indexes of the first and second metal oxide layer, and shown in FIG. 8. As shown in FIG. 8, it was confirmed that the light transmittance of the composite layer is affected by the refractive indexes of the first and second metal oxide layers, and particularly, when the refractive indexes of the first metal oxide layer and the second metal oxide layer were included in the above range of the present application, it was determined that an excellent light transmittance of approximately 80% or more with respect to light having a wavelength of 550 nm was exhibited.

BRIEF DESCRIPTION OF MAIN PARTS IN THE DRAWINGS

101: a polarizing layer
102: a liquid crystal layer
103A, 103B: a composite layer
201A, 201B: a UV blocking layer
301: an OCA layer

What is claimed is:

1. An optical element, comprising:
   a polarizing layer;
   a liquid crystal layer formed on the polarizing layer and including a liquid crystal compound and an anisotropic dye; and
   a composite layer adjacent to the liquid crystal layer, including a first oxide layer, a metal layer and a second oxide layer, which are sequentially formed, and disposed in order that an alignment direction of the liquid crystal compound of the liquid crystal layer is changed by a signal applied by the composite layer.

2. The element according to claim 1, wherein, in an initial state, the liquid crystal layer is present in an aligned state such that an optical axis of the liquid crystal layer has a tilt angle of 0 to 90 degree to a plane of the liquid crystal layer.

3. The element according to claim 1, wherein, in an initial state, the liquid crystal layer is present in an aligned state such that an optical axis of the liquid crystal layer has an angle of 0 to 90 degrees to a direction of an absorption axis of a polarizing plate.

4. The element according to claim 1, wherein the liquid crystal compound and the anisotropic dye are present in the liquid crystal layer in order that alignment is switched by the application of an external signal.

5. The element according to claim 1, further comprising:
   an alignment layer adjacent to the liquid crystal layer.

6. The element according to claim 1, wherein the liquid crystal layer is disposed to switch between a transmission mode in which a transmittance in a visible region is 20% or more and a blocking mode in which a transmittance in a visible region is 3% or less according to the application of an external signal.

7. The element according to claim 1, wherein the anisotropic dye has a dichroic ratio of 5 to 20.

8. The element according to claim 1, wherein the composite layer has a transmittance of 70% or less with respect to light in an infrared region.

9. The element according to claim 1, wherein the composite layer has a sheet resistance of 20Ω/□ or less.

10. The element according to claim 1, wherein the first oxide layer has a higher refractive index than the second oxide layer, and the metal layer has a lower refractive index than the second oxide layer.

11. The element according to claim 1, wherein the metal layer has a refractive index in a range of 0.1 to 1 with respect to light with a wavelength of 550 nm.

12. The element according to claim 1, wherein the metal layer has a thickness in a range of 5 to 20 nm.

13. The element according to claim 1, wherein the metal layer has a sheet resistance of 20Ω/□ or less.

14. The element according to claim 1, wherein the first oxide layer has a refractive index in a range of 1.2 to 2.8, and the second oxide layer has a refractive index in a range of 1.5 to 2.5 with respect to light with a wavelength of 550 nm.

15. The element according to claim 1, wherein the first oxide layer has a thickness in a range of 20 to 60 nm, and the second oxide layer has a thickness in a range of 10 to 100 nm.

16. The element according to claim 1, wherein the second oxide layer has a resistivity in a range of $1.0 \times 10^{-5}$ to $1.0 \times 10^{5}$ Ωcm.

17. The element according to claim 1, wherein each of the first oxide layer and the second oxide layer is a metal oxide layer including at least one metal selected from the group consisting of antimony (Sb), barium (Ba), gallium (Ga), germanium (Ge), hafnium (Hf), indium (In), lanthanum (La), magnesium (Mg), selenium (Se), silicon (Si), tantalum (Ta), titanium (Ti), vanadium (V), yttrium (Y), zinc (Zn) and zirconium (Zr).

18. The element according to claim 17, wherein the second oxide layer further includes at least one second metal selected from the group consisting of gallium (Ga), aluminum (Al), zirconium (Zr), titanium (Ti), niobium (Nb), tantalum (Ta), indium (In) and vanadium (V).

19. The element according to claim 1, wherein the second oxide layer is closer to the liquid crystal layer than the first oxide layer.

20. A sunroof, comprising:
the optical element of claim 1.

* * * * *